United States Patent
Zhu et al.

(10) Patent No.: US 7,639,841 B2
(45) Date of Patent: Dec. 29, 2009

(54) SYSTEM AND METHOD FOR ON-ROAD DETECTION OF A VEHICLE USING KNOWLEDGE FUSION

(75) Inventors: Ying Zhu, Monmouth Junction, NJ (US); Dorin Comaniciu, Princeton Jct., NJ (US); Martin Pellkofer, Pentling (DE); Thorsten Köhler, Deuerling (DE)

(73) Assignees: Siemens Corporation, Iselin, NJ (US); Siemens VDO Automotive AG, Regensburg (DE)

( * ) Notice: Subject to any disclaimer, the term of this patent is extended or adjusted under 35 U.S.C. 154(b) by 984 days.

(21) Appl. No.: 11/311,500

(22) Filed: Dec. 19, 2005

(65) Prior Publication Data

US 2006/0177099 A1    Aug. 10, 2006

Related U.S. Application Data

(60) Provisional application No. 60/637,804, filed on Dec. 21, 2004.

(51) Int. Cl.
　　G06K 9/62　　(2006.01)
　　G06K 9/46　　(2006.01)
　　H04N 7/18　　(2006.01)
　　G05D 1/00　　(2006.01)
　　G01C 22/00　　(2006.01)
　　G06F 17/10　　(2006.01)

(52) U.S. Cl. .............. 382/104; 382/103; 382/107; 382/160; 382/203; 382/209; 340/435; 340/436; 348/118; 348/148; 701/28; 701/301

(58) Field of Classification Search ............ 382/103, 382/104, 107, 155–160, 203, 209, 214–220, 382/224–228; 348/113, 116, 117, 118, 119, 348/148, 149; 701/23, 26, 27, 28, 41, 44, 701/45, 48, 70, 77, 300, 301; 340/435, 436

See application file for complete search history.

(56) References Cited

U.S. PATENT DOCUMENTS

| | | | | | |
|---|---|---|---|---|---|
| 4,739,401 | A | * | 4/1988 | Sacks et al. | 382/103 |
| 4,868,871 | A | * | 9/1989 | Watson, III | 382/103 |
| 4,926,346 | A | * | 5/1990 | Yokoyama | 701/28 |
| 4,931,937 | A | * | 6/1990 | Kakinami et al. | 701/300 |
| 4,969,036 | A | * | 11/1990 | Bhanu et al. | 348/113 |
| 4,970,653 | A | * | 11/1990 | Kenue | 701/301 |
| 5,036,474 | A | * | 7/1991 | Bhanu et al. | 348/117 |
| 5,159,557 | A | * | 10/1992 | Ogawa | 701/300 |

(Continued)

OTHER PUBLICATIONS

Abreu et al., "Video-based multi-agent traffic surveillance system," 2000, IEEE, Intelligent Vehicles Symposium, Proceedings of, pp. 457-462.*

(Continued)

*Primary Examiner*—Bhavesh M Mehta
*Assistant Examiner*—Anthony Mackowey

(57) ABSTRACT

The present invention is directed to a system and method for on-road vehicle detection. A video sequence is received that is comprised of a plurality of image frames. A potential vehicle appearance is identified in an image frame. Known vehicle appearance information and scene geometry information are used to formulate initial hypotheses about vehicle appearance. The potential vehicle appearance is tracked over multiple successive image frames. Potential motion trajectories for the potential vehicle appearance are identified over the multiple image frames. Knowledge fusion of appearance, scene geometry and motion information models are applied to each image frame containing the trajectories. A confidence score is calculated for each trajectory. A trajectory with a high confidence score is determined to represent a vehicle appearance.

46 Claims, 4 Drawing Sheets

U.S. PATENT DOCUMENTS

| | | | | |
|---|---|---|---|---|
| 5,161,632 A * | 11/1992 | Asayama | | 180/167 |
| 5,233,541 A * | 8/1993 | Corwin et al. | | 348/81 |
| 5,253,050 A * | 10/1993 | Karasudani | | 348/118 |
| 5,369,590 A * | 11/1994 | Karasudani | | 701/300 |
| 5,373,456 A * | 12/1994 | Ferkinhoff et al. | | 703/2 |
| 5,390,133 A * | 2/1995 | Sohie | | 342/159 |
| 5,410,346 A * | 4/1995 | Saneyoshi et al. | | 348/116 |
| 5,434,927 A * | 7/1995 | Brady et al. | | 382/104 |
| 5,487,116 A * | 1/1996 | Nakano et al. | | 382/104 |
| 5,500,904 A * | 3/1996 | Markandey et al. | | 382/103 |
| 5,515,448 A * | 5/1996 | Nishitani | | 382/106 |
| 5,521,633 A * | 5/1996 | Nakajima et al. | | 348/118 |
| 5,530,420 A * | 6/1996 | Tsuchiya et al. | | 340/435 |
| 5,530,771 A * | 6/1996 | Maekawa | | 382/103 |
| 5,535,144 A * | 7/1996 | Kise | | 702/158 |
| 5,537,511 A * | 7/1996 | DeAngelis et al. | | 706/24 |
| 5,555,312 A * | 9/1996 | Shima et al. | | 382/104 |
| 5,555,555 A * | 9/1996 | Sato et al. | | 382/104 |
| 5,590,217 A * | 12/1996 | Toyama | | 382/104 |
| 5,592,567 A * | 1/1997 | Kilger | | 382/199 |
| 5,600,731 A * | 2/1997 | Sezan et al. | | 382/107 |
| 5,612,686 A * | 3/1997 | Takano et al. | | 340/903 |
| 5,617,085 A * | 4/1997 | Tsutsumi et al. | | 340/903 |
| 5,621,645 A * | 4/1997 | Brady | | 701/117 |
| 5,638,116 A * | 6/1997 | Shimoura et al. | | 348/118 |
| 5,742,699 A * | 4/1998 | Adkins et al. | | 382/107 |
| 5,761,326 A * | 6/1998 | Brady et al. | | 382/103 |
| 5,765,116 A * | 6/1998 | Wilson-Jones et al. | | 701/41 |
| 5,777,690 A * | 7/1998 | Takeda et al. | | 348/699 |
| 5,892,855 A * | 4/1999 | Kakinami et al. | | 382/291 |
| 5,910,817 A * | 6/1999 | Ohashi et al. | | 348/159 |
| 5,929,785 A * | 7/1999 | Satonaka | | 340/903 |
| 5,937,078 A * | 8/1999 | Hyland et al. | | 382/103 |
| 5,937,079 A * | 8/1999 | Franke | | 382/103 |
| 5,969,755 A * | 10/1999 | Courtney | | 348/143 |
| 5,991,428 A * | 11/1999 | Taniguchi | | 382/107 |
| 6,035,053 A * | 3/2000 | Yoshioka et al. | | 382/104 |
| 6,044,166 A * | 3/2000 | Bassman et al. | | 382/103 |
| 6,072,889 A * | 6/2000 | Deaett et al. | | 382/103 |
| 6,122,597 A * | 9/2000 | Saneyoshi et al. | | 701/301 |
| 6,141,435 A * | 10/2000 | Naoi et al. | | 382/104 |
| 6,185,314 B1 * | 2/2001 | Crabtree et al. | | 382/103 |
| 6,263,088 B1 * | 7/2001 | Crabtree et al. | | 382/103 |
| 6,285,393 B1 * | 9/2001 | Shimoura et al. | | 348/119 |
| 6,298,144 B1 * | 10/2001 | Pucker et al. | | 382/103 |
| 6,301,542 B1 * | 10/2001 | Kirchberger et al. | | 701/93 |
| 6,327,522 B1 * | 12/2001 | Kojima et al. | | 701/1 |
| 6,327,536 B1 * | 12/2001 | Tsuji et al. | | 701/301 |
| 6,370,261 B1 * | 4/2002 | Hanawa | | 382/104 |
| 6,380,934 B1 * | 4/2002 | Freeman et al. | | 345/419 |
| 6,430,303 B1 * | 8/2002 | Naoi et al. | | 382/104 |
| 6,445,809 B1 * | 9/2002 | Sasaki et al. | | 382/104 |
| 6,466,684 B1 * | 10/2002 | Sasaki et al. | | 382/104 |
| 6,477,260 B1 * | 11/2002 | Shimomura | | 382/106 |
| 6,531,959 B1 * | 3/2003 | Nagaoka et al. | | 340/435 |
| 6,542,621 B1 * | 4/2003 | Brill et al. | | 382/103 |
| 6,549,642 B1 * | 4/2003 | Sakurai | | 382/104 |
| 6,553,130 B1 * | 4/2003 | Lemelson et al. | | 382/104 |
| 6,556,692 B1 * | 4/2003 | Gavrila | | 382/104 |
| 6,570,998 B1 * | 5/2003 | Ohtsuka et al. | | 382/104 |
| 6,590,521 B1 * | 7/2003 | Saka et al. | | 342/70 |
| 6,590,999 B1 * | 7/2003 | Comaniciu et al. | | 382/103 |
| 6,594,583 B2 * | 7/2003 | Ogura et al. | | 701/301 |
| 6,597,801 B1 * | 7/2003 | Cham et al. | | 382/103 |
| 6,597,816 B1 * | 7/2003 | Altunbasak et al. | | 382/275 |
| 6,628,835 B1 * | 9/2003 | Brill et al. | | 382/226 |
| 6,636,257 B1 * | 10/2003 | Harada et al. | | 348/148 |
| 6,643,387 B1 * | 11/2003 | Sethuraman et al. | | 382/107 |
| 6,683,969 B1 * | 1/2004 | Nishigaki et al. | | 382/104 |
| 6,687,577 B2 * | 2/2004 | Strumolo | | 701/1 |
| 6,694,044 B1 * | 2/2004 | Pavlovic et al. | | 382/107 |
| 6,704,621 B1 * | 3/2004 | Stein et al. | | 701/1 |
| 6,718,259 B1 * | 4/2004 | Khosla | | 701/200 |
| 6,731,204 B2 * | 5/2004 | Lehmann | | 340/435 |
| 6,731,777 B1 * | 5/2004 | Nishigaki et al. | | 382/106 |
| 6,734,787 B2 * | 5/2004 | Ikeda | | 340/425.5 |
| 6,737,963 B2 * | 5/2004 | Gutta et al. | | 340/435 |
| 6,744,380 B2 * | 6/2004 | Imanishi et al. | | 340/937 |
| 6,757,571 B1 * | 6/2004 | Toyama | | 700/47 |
| 6,765,480 B2 * | 7/2004 | Tseng | | 340/425.5 |
| 6,795,014 B2 * | 9/2004 | Cheong | | 342/118 |
| 6,813,370 B1 * | 11/2004 | Arai | | 382/104 |
| 6,826,292 B1 * | 11/2004 | Tao et al. | | 382/103 |
| 6,842,531 B2 * | 1/2005 | Ohtsuka et al. | | 382/104 |
| 6,845,172 B2 * | 1/2005 | Furusho | | 382/104 |
| 6,847,894 B1 * | 1/2005 | Hasegawa | | 701/301 |
| 6,853,738 B1 * | 2/2005 | Nishigaki et al. | | 382/106 |
| 6,873,912 B2 * | 3/2005 | Shimomura | | 701/301 |
| 6,879,705 B1 * | 4/2005 | Tao et al. | | 382/103 |
| 6,879,706 B2 * | 4/2005 | Satoh et al. | | 382/104 |
| 6,901,152 B2 * | 5/2005 | Lee et al. | | 382/103 |
| 6,906,620 B2 * | 6/2005 | Nakai et al. | | 340/435 |
| 6,937,746 B2 * | 8/2005 | Schwartz | | 382/103 |
| 6,944,317 B2 * | 9/2005 | Pavlovic et al. | | 382/107 |
| 6,954,544 B2 * | 10/2005 | Jepson et al. | | 382/107 |
| 6,963,657 B1 * | 11/2005 | Nishigaki et al. | | 382/106 |
| 6,963,661 B1 * | 11/2005 | Hattori et al. | | 382/154 |
| 6,973,201 B1 * | 12/2005 | Colmenarez et al. | | 382/103 |
| 6,990,216 B2 * | 1/2006 | Yamamura | | 382/106 |
| 6,993,159 B1 * | 1/2006 | Ishii et al. | | 382/104 |
| 6,999,600 B2 * | 2/2006 | Venetianer et al. | | 382/103 |
| 7,034,742 B2 * | 4/2006 | Cong et al. | | 342/70 |
| 7,035,431 B2 * | 4/2006 | Blake et al. | | 382/103 |
| 7,038,577 B2 * | 5/2006 | Pawlicki et al. | | 340/435 |
| 7,042,389 B2 * | 5/2006 | Shirai | | 342/70 |
| 7,046,822 B1 * | 5/2006 | Knoeppel et al. | | 382/103 |
| 7,068,815 B2 * | 6/2006 | Chang et al. | | 382/106 |
| 7,069,130 B2 * | 6/2006 | Yopp | | 701/45 |
| 7,072,494 B2 * | 7/2006 | Georgescu et al. | | 382/103 |
| 7,088,846 B2 * | 8/2006 | Han et al. | | 382/103 |
| 7,124,027 B1 * | 10/2006 | Ernst et al. | | 701/301 |
| 7,127,083 B2 * | 10/2006 | Han et al. | | 382/103 |
| 7,132,933 B2 * | 11/2006 | Nakai et al. | | 340/435 |
| 7,132,959 B2 * | 11/2006 | Seabury et al. | | 340/933 |
| 7,149,327 B2 * | 12/2006 | Okamoto et al. | | 382/104 |
| 7,167,578 B2 * | 1/2007 | Blake et al. | | 382/103 |
| 7,171,023 B2 * | 1/2007 | Kim et al. | | 382/103 |
| 7,190,809 B2 * | 3/2007 | Gutta et al. | | 382/103 |
| 7,221,777 B2 * | 5/2007 | Nagaoka et al. | | 382/104 |
| 7,224,735 B2 * | 5/2007 | Porikli et al. | | 375/240.25 |
| 7,248,718 B2 * | 7/2007 | Comaniciu et al. | | 382/104 |
| 7,263,209 B2 * | 8/2007 | Camus et al. | | 382/104 |
| 7,263,472 B2 * | 8/2007 | Porikli | | 703/2 |
| 7,266,454 B2 * | 9/2007 | Takahama et al. | | 701/301 |
| 7,274,801 B2 * | 9/2007 | Lee | | 382/103 |
| 7,286,707 B2 * | 10/2007 | Liu et al. | | 382/190 |
| 7,336,803 B2 * | 2/2008 | Mittal et al. | | 382/103 |
| 7,352,880 B2 * | 4/2008 | Kim et al. | | 382/103 |
| 7,356,408 B2 * | 4/2008 | Tsuchiya et al. | | 701/211 |
| 7,386,163 B2 * | 6/2008 | Sabe et al. | | 382/153 |
| 7,397,929 B2 * | 7/2008 | Nichani et al. | | 382/103 |
| 7,409,092 B2 * | 8/2008 | Srinivasa | | 382/199 |
| 7,433,496 B2 * | 10/2008 | Ishii et al. | | 382/104 |
| 7,436,980 B2 * | 10/2008 | Sigal et al. | | 382/103 |
| 7,450,736 B2 * | 11/2008 | Yang et al. | | 382/103 |
| 7,463,754 B2 * | 12/2008 | Yang et al. | | 382/103 |
| 7,466,841 B2 * | 12/2008 | Bahlmann et al. | | 382/103 |
| 7,466,842 B2 * | 12/2008 | Tuzel et al. | | 382/103 |
| 7,486,802 B2 * | 2/2009 | Hougen | | 382/104 |
| 7,499,571 B1 * | 3/2009 | Han et al. | | 382/103 |
| 7,519,471 B2 * | 4/2009 | Shibata et al. | | 701/211 |
| 7,526,101 B2 * | 4/2009 | Avidan | | 382/103 |
| 7,542,835 B2 * | 6/2009 | Takahama et al. | | 701/45 |
| 7,561,720 B2 * | 7/2009 | Miyahara | | 382/104 |

| | | | | |
|---|---|---|---|---|
| 7,561,721 B2* | 7/2009 | Miyahara | 382/104 |
| 7,596,243 B2* | 9/2009 | Paniconi et al. | 382/107 |
| 2001/0028729 A1* | 10/2001 | Nishigaki et al. | 382/104 |
| 2002/0087269 A1* | 7/2002 | Sasaki et al. | 701/301 |
| 2002/0134151 A1* | 9/2002 | Naruoka et al. | 73/291 |
| 2002/0159616 A1* | 10/2002 | Ohta | 382/104 |
| 2002/0159627 A1* | 10/2002 | Schneiderman et al. | 382/154 |
| 2003/0053658 A1* | 3/2003 | Pavlidis | 382/103 |
| 2003/0053659 A1* | 3/2003 | Pavlidis et al. | 382/103 |
| 2003/0055563 A1* | 3/2003 | Lars et al. | 701/301 |
| 2003/0091228 A1* | 5/2003 | Nagaoka et al. | 382/154 |
| 2003/0108220 A1* | 6/2003 | Jepson et al. | 382/103 |
| 2003/0123703 A1* | 7/2003 | Pavlidis et al. | 382/103 |
| 2003/0151664 A1* | 8/2003 | Wakimoto et al. | 348/148 |
| 2003/0156737 A1* | 8/2003 | Ohtsuka et al. | 382/104 |
| 2003/0160866 A1* | 8/2003 | Hori et al. | 348/148 |
| 2003/0169340 A1* | 9/2003 | Kamijo et al. | 348/169 |
| 2003/0185421 A1* | 10/2003 | Okamoto et al. | 382/104 |
| 2003/0210807 A1* | 11/2003 | Sato et al. | 382/104 |
| 2003/0219146 A1* | 11/2003 | Jepson et al. | 382/103 |
| 2003/0235327 A1* | 12/2003 | Srinivasa | 382/104 |
| 2004/0057599 A1* | 3/2004 | Okada et al. | 382/103 |
| 2004/0096082 A1* | 5/2004 | Nakai et al. | 382/104 |
| 2004/0107033 A1* | 6/2004 | Rao et al. | 701/45 |
| 2004/0131233 A1* | 7/2004 | Comaniciu et al. | 382/104 |
| 2004/0151342 A1* | 8/2004 | Venetianer et al. | 382/103 |
| 2004/0151343 A1* | 8/2004 | Lee | 382/103 |
| 2004/0183905 A1* | 9/2004 | Comaniciu et al. | 348/148 |
| 2004/0197010 A1* | 10/2004 | Lee et al. | 382/103 |
| 2004/0234136 A1* | 11/2004 | Zhu et al. | 382/224 |
| 2004/0252863 A1* | 12/2004 | Chang et al. | 382/104 |
| 2005/0002572 A1* | 1/2005 | Saptharishi et al. | 382/224 |
| 2005/0004762 A1* | 1/2005 | Takahama et al. | 701/301 |
| 2005/0093697 A1* | 5/2005 | Nichani et al. | 340/545.1 |
| 2005/0102070 A1* | 5/2005 | Takahama et al. | 701/1 |
| 2005/0104959 A1* | 5/2005 | Han et al. | 348/143 |
| 2005/0104960 A1* | 5/2005 | Han et al. | 348/143 |
| 2005/0104962 A1* | 5/2005 | Han et al. | 348/143 |
| 2005/0125121 A1* | 6/2005 | Isaji et al. | 701/36 |
| 2005/0143887 A1* | 6/2005 | Kinoshita | 701/45 |
| 2005/0169501 A1* | 8/2005 | Fujii et al. | 382/104 |
| 2005/0175219 A1* | 8/2005 | Yang et al. | 382/103 |
| 2005/0196020 A1* | 9/2005 | Comaniciu et al. | 382/104 |
| 2005/0228587 A1* | 10/2005 | Kobayashi et al. | 701/300 |
| 2005/0237385 A1* | 10/2005 | Kosaka et al. | 348/42 |
| 2005/0248654 A1* | 11/2005 | Tsujino et al. | 348/169 |
| 2005/0285937 A1* | 12/2005 | Porikli | 348/143 |
| 2005/0286767 A1* | 12/2005 | Hager et al. | 382/190 |
| 2006/0002587 A1* | 1/2006 | Takahama et al. | 382/103 |
| 2006/0111819 A1* | 5/2006 | Serapio et al. | 701/28 |
| 2006/0140449 A1* | 6/2006 | Otsuka et al. | 382/104 |
| 2006/0153459 A1* | 7/2006 | Zhang et al. | 382/224 |
| 2006/0165277 A1* | 7/2006 | Shan et al. | 382/159 |
| 2006/0171563 A1* | 8/2006 | Takashima et al. | 382/104 |
| 2006/0182312 A1* | 8/2006 | Nakai et al. | 382/103 |
| 2006/0262959 A1* | 11/2006 | Tuzel et al. | 382/103 |
| 2007/0086621 A1* | 4/2007 | Aggarwal et al. | 382/103 |
| 2007/0211917 A1* | 9/2007 | Nakano et al. | 382/103 |
| 2008/0025568 A1* | 1/2008 | Han et al. | 382/103 |

OTHER PUBLICATIONS

Willett et al., "Integration of Bayes detection with target tracking," Jan. 2001, IEEE, Signal Processing, IEEE Transactions on, vol. 49, Issue 1, pp. 17-29.*

Kato et al., "Preceding vehicle recognition based on learning from sample images," Dec. 2002, IEEE, Intelligent Transportation Systems, IEEE Transactions on, vol. 3, Issue 4, pp. 252-260.*

Handmann et al., "An image processing system for driver assistance," Apr. 2000, Elsevier Science B.V., Image and Vision Computing, vol. 18, Issue 5, pp. 367-376.*

Schneiderman, H.; Kanade, T., "A statistical method for 3D object detection applied to faces and cars," 2000, IEEE, Computer Vision and Pattern Recognition, Proceedings of, vol. 1, pp. 746-751.*

Betke et al., "Multiple vehicle detection and tracking in hard realtime," Sep. 19-20, 1996, IEEE, Intelligent Vehicles Symposium, Proceedings of the 1996, pp. 351-356.*

Sun et al., "A real-time precrash vehicle detection system," Dec. 3-4, 2002, IEEE, Applications of Computer Vision, Proceedings. Sixth IEEE Workshop, pp. 171-176.*

Gupte et al., "Detection and classification of vehicles," Mar. 2002, IEEE, Intelligent Transportation Systems, IEEE Transaction on, vol. 3, No. 1, pp. 37-47.*

Enkelmann, W., "Obstacle detection by evaluation of optical flow fields from image sequences," 1990, Springer Berline/Heidelberg, Computer Vision, Lecture Notes in Computer Science, vol. 427, pp. 134-138.*

Dellaert, F.; Thorpe, C., "Robust car tracking using Kalman filtering and Bayesian templates," 1997, Conference on Intelligent Transportation Systems, pp.*

Dallart, F., "CANSS: A candidate selection and search algorithm to initialize car tracking," Oct. 1997, Carnegie Mellon University, CMU-RI-TR-97-34.*

Kang et al., "Tracking objects from multiple stationary and moving cameras," Feb. 23, 2004, IEEE, Intelligent Distributed Surveillance Systems, pp. 31-35.*

Haag, M.; Nagel, H., "Combination of edge element and optical flow estimates for 3D model based vehicle tracking in traffic image sequences," Dec. 1999, Springer Netherlands, International Journal of Computer Vision, vol. 35, No. 3, pp. 295-319.*

Schmid, M., "An approach to model based 3-D recognition of vehicles in real time by machine vision," Sep. 12-16, 1994, IEEE, Intelligent Robots and Systems '94, Proceedings of the IEEE/RSJ/GI International Conference on, vol. 3, pp. 2064-2071.*

Zhu, Y.; Comaniciu, D.; Pelkofer, M.; Koehler, T., "Passing vehicle detection form dynamic background using information fusion," Oct. 3-6, 2004, IEEE, Intelligent Transportation Systems, The 7$^{th}$ Annual Conference on, pp. 564-569.*

Isard, M.; Blake, A., "Condensation—Conditional Density Propagation for Visual Tracking," 1998, Kluwer Academic Publishers, International Journal of Computer Vision, vol. 29, pp. 5-28.*

Donohoe, G.W., "Combining Segmentation and Tracking for the Classification of Moving Objects in Video Scenes," 1988, Maple Press, Signals, Systems and Computer, Twenty-Second Asilomar Conference on, vol. 2, pp. 533-538.*

Thomanek, F.; Dickmanns, D., "Obstacle detection, tracking and state estimation for autonomous road vehicles guidance," Jul. 7-10, 1992, IEEE, Intelligent Robots and Systems, Proceedings of the 1992 International Conference on, vol. 2, pp. 1399-1406.*

Ferryman, J.; Maybank, S.; Worrall, A., "Visual Surveillance for Moving Vehicles," Jun. 2000, Springer Netherlands, International Journal of Computer Vision, vol. 37, No. 2, pp. 187-197.*

Kruger, W., "Robust real-time ground plane motion compensation from a moving vehicle," Dec. 1999, Springer Berlin / Heidelberg, Machine Vision and Applications, vol. 11, No. 4, pp. 203-212.*

Comaniciu, D., "Nonparametric Information Fusion for Motion Estimation," Jun. 18-20, 2003, IEEE, Computer Vision and Pattern Recognition, 2003. Proceedings, Computer Society Conference on, vol. 1, pp. I-59-I-66 vol. 1.*

* cited by examiner

SYSTEM AND METHOD FOR ON-ROAD DETECTION OF A VEHICLE USING KNOWLEDGE FUSION

CROSS REFERENCE TO RELATED APPLICATION

This application claims the benefit of U.S. Provisional Application Ser. No. 60/637,804 filed on Dec. 21, 2004, which is incorporated by reference in its entirety.

FIELD OF THE INVENTION

The present invention is directed to a system and method for vehicle detection, and more particularly, to a system and method for on-road vehicle detection using knowledge fusion.

BACKGROUND OF THE INVENTION

With the decreasing cost of optical sensors and increasing computing power of microprocessors, vision-based systems have been widely accepted as an integral part of the feasible solutions to driver assistance. The ability of detecting other vehicles on the road is essential to sensing and interpreting driving environments, which enables important functions like adaptive cruise control and pre-crash sensing. Vehicle detection requires effective vision algorithms that can distinguish vehicles from complex road scenes accurately. A great challenge comes from the large variety of vehicle appearance as well as different scenarios of driving environments. Vehicles vary in size, shape and appearance, which lead to considerable amount of variance in the class of vehicle images. Illumination changes in outdoor environments introduce additional variation in vehicle appearance. Meanwhile, unpredictable traffic situations create a wide range of nonstationary backgrounds with complex clutters. Moreover, high degrees of reliability and fast processing are required for driver assistance tasks, which also increase the difficulty of the task.

Known vision techniques have been used in vehicle detection. A number of approaches use empirical knowledge about vehicle appearance, such as symmetry, horizontal and vertical occluding edges around vehicle boundaries to detect the rear-view appearance of vehicles. These methods are computationally efficient but lack robustness because the parameters (e.g., thresholds) involved in edge detection and hypothesis generation are sensitive to lighting conditions and the dynamic range in image acquisition. To achieve reliable vehicle detection, several appearance-based methods exploit machine learning and pattern classification techniques to obtain elaborated classifiers that separate the vehicle class from other image patterns. Bayesian classifiers have also been used for classification in which a mixture of Gaussian filters and histograms were used to model the class distribution of vehicles and non-vehicles. Another method uses neural network classifiers that are trained on image features obtained from local orientation coding. Still other methods use Support Vector Machines (SVMs) that are trained on wavelet features.

Many of the methods mentioned above use partial knowledge for vehicle detection. For example, appearance-based methods mainly utilize the knowledge about vehicle and non-vehicle appearance, while motion-based detectors focus on the knowledge about relative vehicle motion. To make a detection system reliable, all the available knowledge should be utilized in a principled manner. There is a need for a vehicle detection system which is capable of fusing multiple sources of data over multiple image frames in order to more consistently and more accurately detect a vehicle.

SUMMARY OF THE INVENTION

The present invention is directed to a system and method for on-road vehicle detection. A video sequence is received that is comprised of a plurality of image frames. A potential vehicle appearance is identified in an image frame. Known vehicle appearance information and scene geometry information are used to formulate initial hypotheses about vehicle appearance. The potential vehicle appearance is tracked over multiple successive image frames. Potential motion trajectories for the potential vehicle appearance are identified over the multiple image frames. Knowledge fusion of appearance, scene geometry and motion information models are applied to each image frame containing the trajectories. A confidence score is calculated for each trajectory. A trajectory with a high confidence score is determined to represent a vehicle appearance.

BRIEF DESCRIPTION OF THE DRAWING

Preferred embodiments of the present invention will be described below in more detail, wherein like reference numerals indicate like elements, with reference to the accompanying drawings.

DETAILED DESCRIPTION

Figure 1:
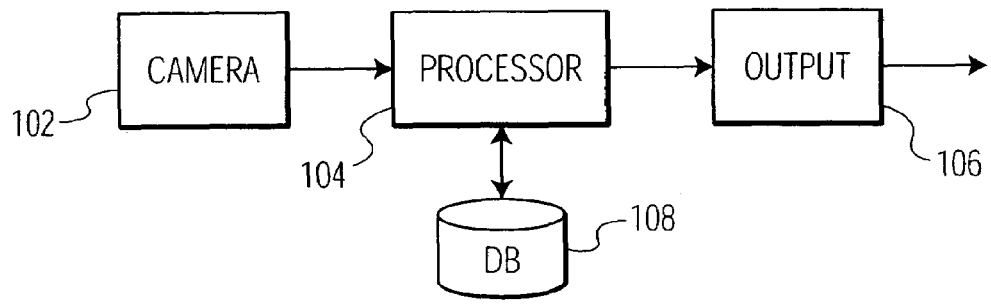
FIG. 1 is a system block diagram of a system for detecting preceding vehicles in accordance with the present invention.

The present invention is directed to an integrated framework for on-road vehicle detection that uses knowledge fusion of appearance, scene geometry and vehicle motion. FIG. 1 illustrates a block diagram of a system for implementing the present invention. A camera 102 is used to capture images of a road and its surroundings. As would be expected with a typical road image, the image includes background images, such as buildings, trees, and houses, and vehicles driving on the road. The images are communicated to a processor 104 which analyzes the image intensity and image motion to detect vehicles in front of the ego-vehicle.

Appearance, geometry and motion information are fused over multiple image frames. The knowledge of vehicle/non-vehicle appearance, scene geometry and vehicle motion is utilized through prior models obtained by learning, probabilistic modeling and estimation algorithms. The prior models are stored in database 108. Once a vehicle is identified at a sufficient confidence level, the vehicle is identified via an output device 106. The output device 106 provides an output signal which communicates to the user or following modules the presence of the vehicle as well as its location and size within an image frame. The output signal may be an audible signal or other type of warning signal. The output device 106 may also include a display for viewing the detected vehicles. The display provides a view of the images taken by the camera 102 which are then enhanced to indicate vehicles that have been detected and which are being tracked. The detection of a vehicle can also be incorporated with other vehicle features such as automatic cruise control and collision avoidance systems.

On-road vehicle detection is different than detecting vehicles in still images. In an on-board vision system, preceding vehicles appear in multiple image frames consistently. The information of vehicle appearance, vehicle motion as well as scene geometry can be exploited jointly to ensure robust and reliable detection. Appearance information provides strong discrimination for distinguishing vehicles from non-vehicles. Motion information has the ability of associating vehicle appearance over time. With temporal data association, detection becomes more robust against isolated errors made by appearance detectors. The knowledge about scene geometry induces strong constraints on where a vehicle on the road would appear on the image plane. Incorporating geometry information into detection can reduce certain errors such as detecting vehicles in the sky or on a tree.

In accordance with the present invention, it is important to detect consistent vehicle appearance over multiple image frames. If $\{I_1, I_2, \ldots, I_m\}$ denotes m consecutive image frames, and $(x_k, s_k)$ is the vehicle location ($x_k = [x,y]_k'$) and size ($s_k$) in the k-th frame, and $I_k(x_k, s_k)$ as the image patch of size $s_k$ at location $x_k$ of the k-th frame (k=1, ..., m). Essentially, $\{(x_1, s_1), \ldots, (x_m, s_m)\}$ defines a trajectory of vehicle appearance on the image plane. Given the observation of m consecutive image frames $\{I_k\}_{k=1}^m$ and the knowledge of scene geometry, the likelihood of consistent appearance of an on-road vehicle on the image plane is expressed as $$p_m((x_1, s_1), \ldots (x_m, s_m) | I_1, \ldots, I_m) \cdot \quad (1)$$

$$\prod_{k=1}^m p_g((x_k, s_k) | \text{scene geometry}) \cdot \prod_{k=1}^m P_a(I_k(x_k, s_k) \in \text{vehicle})$$

The first term $p_m((x_1, s_1), \ldots (x_m, s_m) | I_1, \ldots, I_m)$ defines the likelihood of the appearance of the trajectory $\{(x_l, s_1), \ldots, (x_m, s_m)\}$ being consistent. The subscript m is used in the notation because this term incorporates motion information to determine temporal association of object appearance. The second term, $$\prod_{k=1}^m p_g((x_k, s_k) |$$

scene geometry) defines the likelihood of an on-road vehicle appearing on an admissible trajectory $\{(x_1, s_1, ), \ldots, (x_m, s_m))\}$ given the knowledge of scene geometry. The subscript g is used in the notation to indicate geometry information being exploited. The third term $$\prod_{k=1}^m P_a(I_k(x_k, s_k) \in \text{vehicle})$$

vehicle) defines the probability that the image patches $I_k(x_k, s_k)$ (k=1, ..., m) belong to the vehicle class, where the subscript a in the notation indicates the use of appearance information.

Figure 2:
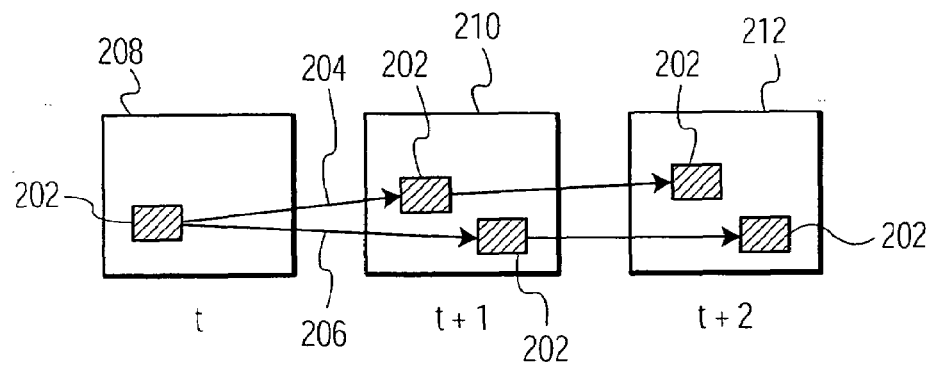
FIG. 2 illustrates an example of appearance trajectories in accordance with the present invention.

An example of appearance trajectories is illustrated in FIG. 2. A vehicle 202 is shown over time in a number of subsequent image frames 208, 210, 212 (i.e., time t, t+1, t+2). In each subsequent image frame, the possible appearance trajectories 204, 206 are shown. As more information about the vehicle is obtained, the correct trajectory can be identified. Over time the possible appearance trajectories are maintained and the probability of their likelihood is calculated. If the probability falls below a predetermined threshold, the trajectory is dropped from consideration.

Figure 3:
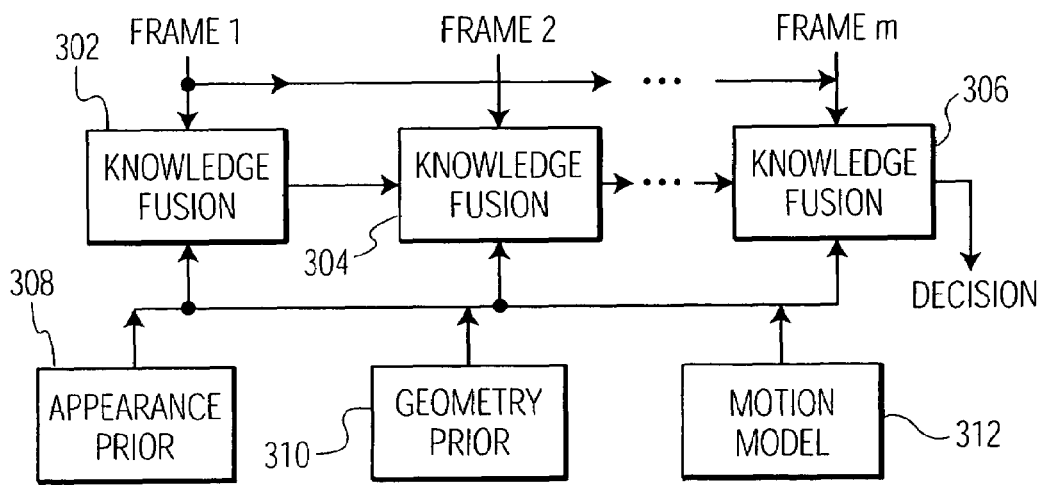
FIG. 3 is a block diagram of an integrated framework for knowledge fusion in accordance with the present invention.

Using the above probabilistic formulation, an integrated framework of knowledge fusion in accordance with the present invention is shown in FIG. 3. The prior models of appearance $P_a$ 308, geometry $p_g$ 310 and motion $p_m$ 312 are used to fuse and propagate information over time. To detect on-road vehicles in an image sequence, the appearance and geometry models $P_a$, $p_g$ are used to generate initial hypotheses of vehicle appearance. Using the motion model $p_m$, the initial hypotheses are tracked over successive image frames 302-306. Consequently, the initial hypotheses evolve into hypotheses of vehicle appearance trajectories.

After a number of image frames, the likelihood of consistent appearance being a vehicle is compared with a threshold to decide whether the appearance trajectory represents a vehicle or non-vehicle. In accordance with the present invention, strong geometry and motion constraints are exploited to improve the reliability of the over-all detection system. Note that the use of motion information from multiple frames causes delayed decisions. However, in practice, a small number of frames can be used (e.g., <10 frames) to avoid significant delay.

Figure 4:
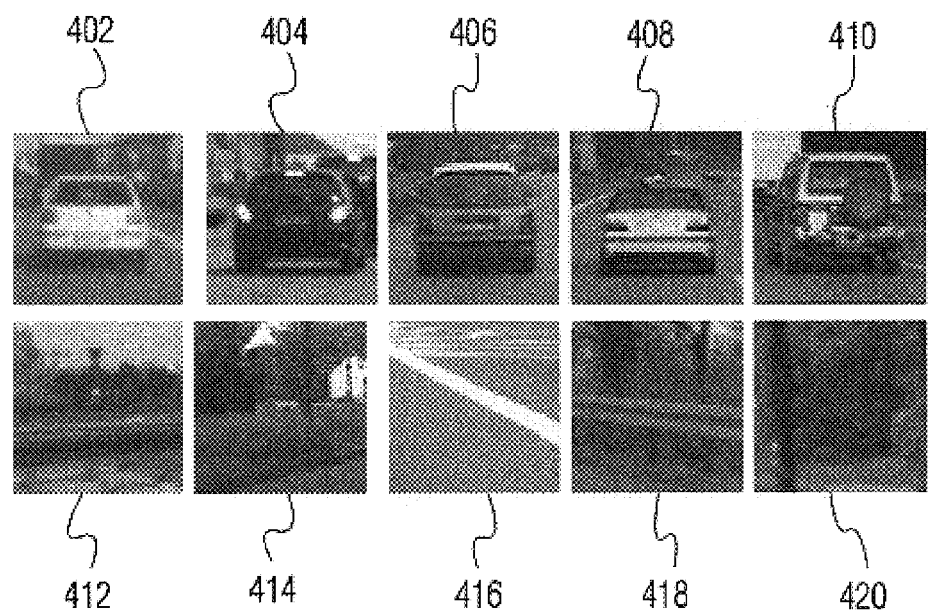
FIG. 4 shows examples of vehicle and non-vehicle training samples in accordance with the present invention.

In accordance with the present invention, prior knowledge of vehicle and non-vehicle appearance provides discriminant information for separating the vehicle class from the non-vehicle class. A machine learning algorithm, AdaBoost, is adopted to learn appearance priors from vehicle and non-vehicle examples. The boosting technique has been shown to be very effective in learning binary classifiers for object detection. Examples of vehicle and non-vehicle training samples are shown in FIG. 4. Images 402-410 show training samples for vehicles and images 412-420 show training samples for non-vehicles.

The appearance model is obtained from image examples through learning. In general, any learning algorithm can be used as well to construct an appearance model from image examples. Here, the Adaboost algorithm is used as an example of learning an appearance model from image examples. An image sample, denoted by I and its class label by $l(l \in \{+1, -1\})$. The method finds a highly accurate classifier H(I) by combining many classifiers $\{h_j(I)\}$ with weak performance.

$$H(I) = \text{sign}(f(I)); \quad f(I) = \sum_j \alpha_j h_j(I) \quad (2)$$

where $h_j(I) \in (+1, -1)$

Given a set of labeled training samples $\{(I_i, l_i)\}$, the Adaboost algorithm chooses $\{\alpha_j\}$ by minimizing an exponential loss function $\Sigma_i \exp(-l_i \Sigma_j h_j(I_i))$ which is determined by the classification error on the training set. Simple image features are used to define weak classifiers. Feature values are thresholded to produce weak hypotheses. The optimal thresholds are automatically determined by the boosting algorithm. An additional procedure of joint optimization on $\{\alpha_j\}$ is performed to further reduce the error rate of the final classifier. In accordance with the present invention, separate classifiers are used to classify cars and trucks from the non-vehicle class. Vehicle samples collected from traffic videos captured in various driving scenarios are used. Non-vehicle samples collected from image regions containing background clutters and extended through the bootstrap procedure are also used.

A posteriori probability can be derived from the classifier response f(I).

$$P_a(l=1|I) = \frac{e^{f(I)}}{e^{-f(I)} + e^{f(I)}} \quad (3)$$

Class labels for vehicles and non-vehicles are +1 and −1 respectively. The probability term $P_a$ in (I) can be evaluated as $$\prod_{k=1}^m P_a(I_k(x_k, s_k) \in \text{vehicle}) = \prod_{k=1}^m \frac{e^{f(I_k(x_k, s_k))}}{e^{-f(I_k(x_k, s_k))} + e^{f(I_k(x_k, s_k))}} \quad (4)$$

In general, other learning methods such as Support Vector Machines, Neural Networks can be adopted to obtain appearance models, as long as a proper probabilistic model $P_a(l=1|I)$ is derived by these methods.

Scene context plays an important role in improving the reliability of a vehicle detection system. Strong constraints on where vehicles are likely to appear can be inferred from the knowledge of scene geometry. Through perspective projection, points in the 3D world $p_w$ are mapped to points on the 2D image plane $p_{im}$.

$$p_{im} = Tp_w$$

$$T = T_{internal} T_{perspective} T_{external} \quad (5)$$

The entire image formation process comprises perspective projection and transformation induced by internal and external camera calibration. Assuming that a vehicle is on a flat road plane, vehicle size in the world $s_w$ is known and the internal and external camera parameters $\theta_{internal}, \theta_{external}$ are available. Given the location of vehicle appearance on the image plane $x_{im}$, the size $s_{im}$ of the vehicle appearance on the image plane can be easily determined as a function of $x_{im}$ and $\theta = \{s_w, \theta_{internal}, \theta_{external}\}$.

$$s_{im} = g(x_{im}, s_w, \theta_{internal}, \theta_{external}) \quad (6)$$

In practice, the flat road assumption may be violated, vehicles vary in size and the camera calibration may not be very accurate. To address such variance of the parameters, a probability model is used to characterize the geometry constraint. The conditional distribution of vehicle size $s_{im}$ on the image plane given its location can be modeled by a normal distribution $N(\bullet; \mu, \sigma^2)$ with mean $\mu = g(x_{im}, s_w, \theta_{internal}, \theta_{external})$ and variance $\sigma^2$ determined by the variance of the parameter set $\theta = \{s_w, \theta_{internal}, \theta_{external}\}$ and the deviation of the road surface from the planar assumption.

$$p(s_{im}|x_{im}) = N(s_{im}; \mu, \sigma^2) \quad \mu = g(x_{im}, \theta) \quad (7)$$

$$\sigma^2 = \sigma^2(x_{im}, \sigma_\theta^2)$$

Given the geometry constraint, the likelihood of a vehicle being present at location $x_{im}$ with size $s_{im}$ on the image plane is given by $$p(x_{im}, s_{im}) = p(x_{im}) p(s_{im}|x_{im}) = c \cdot N(s_{im}; g(x_{im}, \theta), \sigma^2(x_{im}, \sigma_\theta^2)) \quad (8)$$

where c is a constant.

A uniform distribution is assumed for the prior probability of the vehicle location $x_{im}$. Consequently, the geometry model $p_g$ in (1) is formulated as $$\prod_{k=1}^m p_g(x_k, s_k) | \text{scene geometry} = \kappa \prod_{k=1}^m N\begin{pmatrix} s_k; g(x_k, \theta), \\ \sigma^2(x_k, \theta) \end{pmatrix} \quad (9)$$

Figure 5:
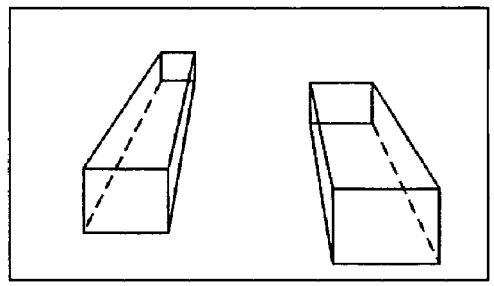
FIG. 5 illustrates an example of a geometry constraint on appearance size and location in accordance with the present invention.

Information about the road geometry can be used to refine the distribution model of $x_{im}$. An example of a geometry constraint on size and location is illustrated in FIG. 5. The location and the size of vehicle appearance in the image plane is dependent. The size of a vehicle appearance in the image plane is constrained given the image location of the vehicle, and vice versa For instance, if a vehicle is observed in the lower portion of the image frame, its appearance is larger than a vehicle that appears in the upper portion of the image.

To derive the motion model in (1), the Markov property of vehicles in the image plane is assumed, i.e., given the vehicle location and size $(x_t, s_t)$ at time t, future location and size $(x_{t+k}, s_{t+k})$ $(k \geq 1)$ are independent of past observations $\{I_1, \ldots, I_{t-1}\}$. In accordance with this assumption, the motion model $p_m$ used in the fusion framework (1) can be written as $$p_m \begin{pmatrix} (x_1, s_1), \ldots, \\ (x_m, s_m) \\ |I_1, \ldots, \\ I_m \end{pmatrix} = p_m \begin{pmatrix} (x_1, s_1) \\ |I_1 \end{pmatrix} \prod_{k=1}^{m-1} p_m \begin{pmatrix} (x_{k+1}, s_{k+1}) \\ |(x_k, s_k), \\ I_{k+1}, I_k \end{pmatrix} \quad (10)$$

$$= c' \cdot \prod_{k=1}^{m-1} p_m((x_{k+1}, s_{k+1}) | (x_k, s_k), I_{k+1} I_k)$$

where c' is a constant.

The product term $p_m((x_{k+1}, s_{k+1})|(x_k, s_k), I_{k+1}, I_k)$ represents the likelihood of a vehicle moving from location $x_k$, size $s_k$ in frame $I_k$ to location $X_{k+1}$, size $s_{k+1}$ in frame $I_{k+1}$ given that $\{I_k, I_{k+1}\}$ are observed.

To solve the likelihood term $p_m((x_{k+1}, s_{k+1})|(x_k, s_k), I_{k+1}, i_k)$ the motion estimation algorithm is extended to estimate a special form of affine motion with translation $u = [u_x, u_y]$ and scaling parameter a. Under the brightness consistency assumption, $$I_k(x) = I_{k+1}(ax + u) \quad x = [x, y]'; \quad u = [u_x, u_y]' \quad (11)$$

the optical flow equation is generalized to $$[\nabla_x^T I_k(x) \cdot x] \alpha + \partial_x I_k(x) u_x + \partial_y I_k(x) u_y = [\nabla_x^T I_k(x) \cdot x] - \partial_t I_k(x) \quad (12)$$

where $\nabla_x I_k(x) = [\partial_x I(x), \partial_y I(x)]'$ and $\partial_t I(x)$ are spatial and temporal derivatives at image location x. An unbiased estimation of scaling and translation vector can be obtained by solving a least square problem.

$$\widehat{[a, u_x, u_y]}'_k = E\{[a, u_x, u_y]'_k \mid x_k, I_{k+1}, I_k\} \quad (13)$$
$$= (A'_k A_k)^{-1} A'_k B_k$$

$$A_k = \begin{bmatrix} \nabla_x^T I_k(x_1) \cdot x_1 & \partial_x I_k(x_1) & \partial_y I_k(x_1) \\ \vdots & \vdots & \vdots \\ \nabla_x^T I_k(x_N) \cdot x_N & \partial_x I_k(x_N) & \partial_y I_k(x_N) \end{bmatrix}$$

$$B_k = [\nabla_k I_k(x_1), \ldots, \nabla_x I_k(x_N)]'$$

where N is the number of pixels in the local image region used for estimation. The covariance of the unbiased estimate $[a, u_x, u_y]'_k$ can be derived as follows.

$$Cov\{\widehat{[a, u_x, u_y]}'_k\} = \hat{\sigma}^2 (A'_k A_k)^{-1} \quad (14)$$

$$\hat{\sigma}^2 = \frac{1}{N-3} \left\| A_k \cdot \widehat{[a, u_x, u_y]}'_k - B_k \right\|^2$$

Given the vehicle location $x_k$ and size $s_k$ in the k-th frame as well as the observed image frames $\{I_k, I_{k+1}\}$, the vehicle location and size in the k-th frame can be estimated through the affine transform $$[x_{k+1}, y_{k+1}, s_{k+1}]' = C_k \cdot [a, u_x, u_y]'_k \quad (15)$$

$$C_k = \begin{bmatrix} x_k & 1 & 0 \\ y_k & 0 & 1 \\ 1 & 0 & 0 \end{bmatrix}$$

$$E\{[x_{k+1}, y_{k+1}, s_{k+1}]'\} = C_k \cdot E\{[a, u_x, u_y]'_k\} \quad (16)$$
$$Cov\{[x_{k+1}, y_{k+1}, s_{k+1}]'\} = C_k \cdot Cov\{[a, u_x, u_y]'_k\} \cdot C'_k$$

Given the unbiased estimate $[a, u_x, u_y]'_k$ and its covariance $Cov\{[a, u_x, u_y]'_k\}$ obtained by the motion estimation algorithm, the likelihood term $p_m(x_{k+1} \mid x_k, I_k, I_{k-1})$ can be modeled as a multivariate normal distribution.

$$p_m((x_{k+1}, s_{k+1}) \mid (x_k, s_k), I_{k+1}, I_k) = \quad (17)$$
$$N\left((x_{k+1}, s_{k+1}); \mu_{k+1}, \sum_{k+1}\right)$$

$$\mu_{k+1} = C_k \cdot \widehat{[a, u_x, u_y]}'_k$$

$$\sum_{k+1} = C_k \cdot Cov\{\widehat{[a, u_x, u_y]}'_k\} \cdot C'_k$$

Consequently, the motion model (10) is expressed as $$p_m((x_1, s_1), \ldots , \quad (18)$$
$$(x_m, s_m) \mid I_1, \ldots, I_m) = \kappa \prod_{k=1}^{m-1} N((x_{k+1}, s_{k+1});$$
$$\mu_{k+1}, \sum_{k+1})$$

In accordance with the present invention, the prior models of appearance, geometry and motion have been described as well as method for obtaining these prior models. Using these prior models, knowledge fusion is performed on the image frame level. Initially, appearance and geometry models are used to generate hypotheses of vehicle appearance. From equations (4) and (9), the likelihood of a vehicle appearance, i.e., length-1 trajectory, is given by $$l_1 \alpha\, p_g((x_1, s_1) \mid \text{scene geometry}) \cdot P_a(I_1(x_1, s_1) \in \text{vehicle}) \quad (19)$$

The initial hypotheses are pruned and trajectories of high likelihood are kept. Hypotheses are updated sequentially over time using appearance, geometry and motion information.

$$l_{k+1} \alpha\, l_k \cdot p_m((x_{k+1}, s_{k+1}) \mid (x_k, s_k), I_{k+1}, I_k) \cdot p_g((x_{k+1}, s_{k+1}) \mid \text{scene geometry}) \cdot P_a(I_{k+1}(x_{k+1}, s_{k+1}) \in \text{vehicle}) \quad (20)$$

where the trajectories are extended into a new image frame $I_{k+1}$.

$$(x_{k+1}, s_{k+1}) = \arg\max_{(x,s)} p_m((x,s) \mid (x_k, s_k), I_{t+1}, I_k) \cdot p_g((x,s) \mid \text{scene geometry}) \cdot P_a(I_{k+1}(x_{k+1}, s_{k+1}) \in \text{vehicle}) \quad (21)$$

For computational efficiency, trajectories with low likelihood values are terminated during the fusion process. After the information is accumulated over a number of frames, decisions are made by thresholding the likelihood values.

$$\{(x_1, s_1), \ldots, (x_m, s_m)\} \begin{cases} \in \text{vehicle} & l_m > \tau \\ \in \text{non-vehicle} & \text{otherwise} \end{cases} \quad (22)$$

Figure 6A:
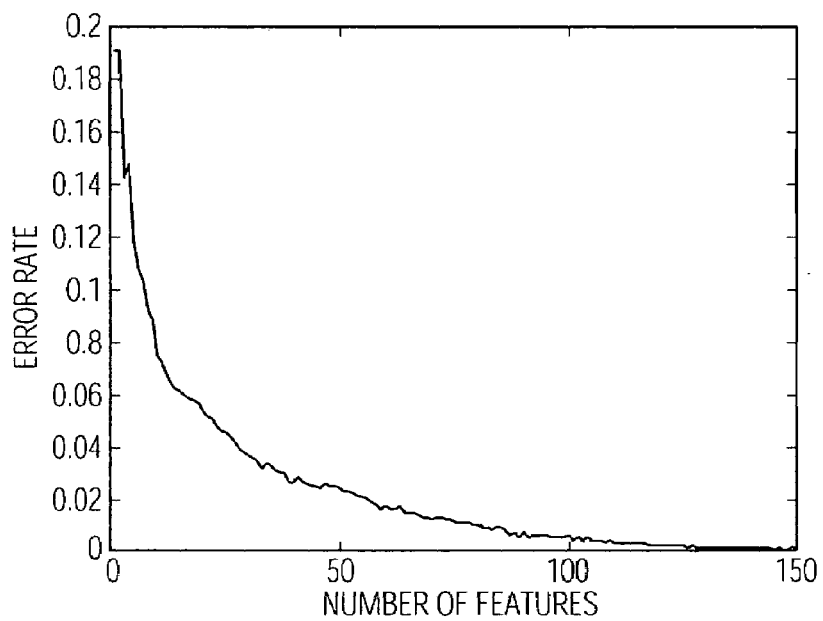
FIGS. 6a and 6b illustrate empirical error rates of car classifier and truck classifier in accordance with the present invention.
Figure 6B:
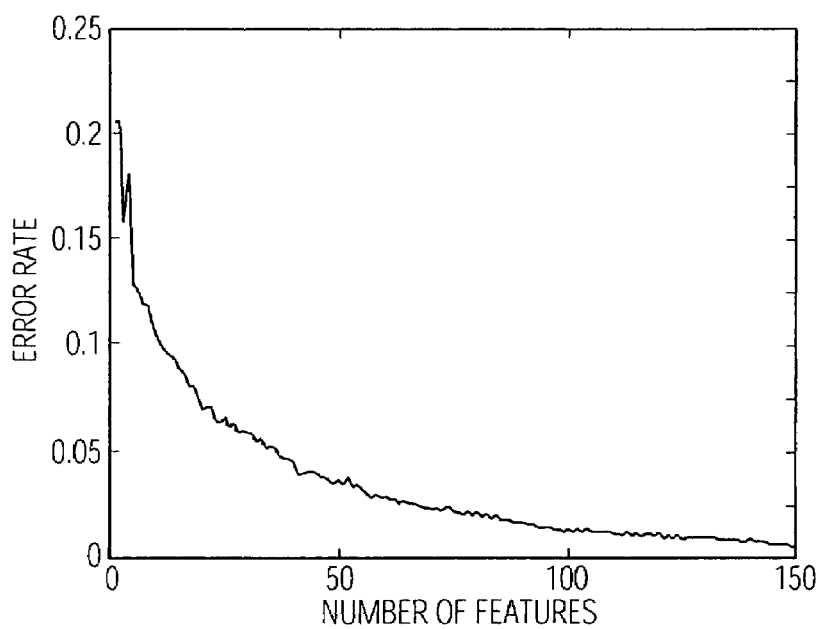
Figure 7:
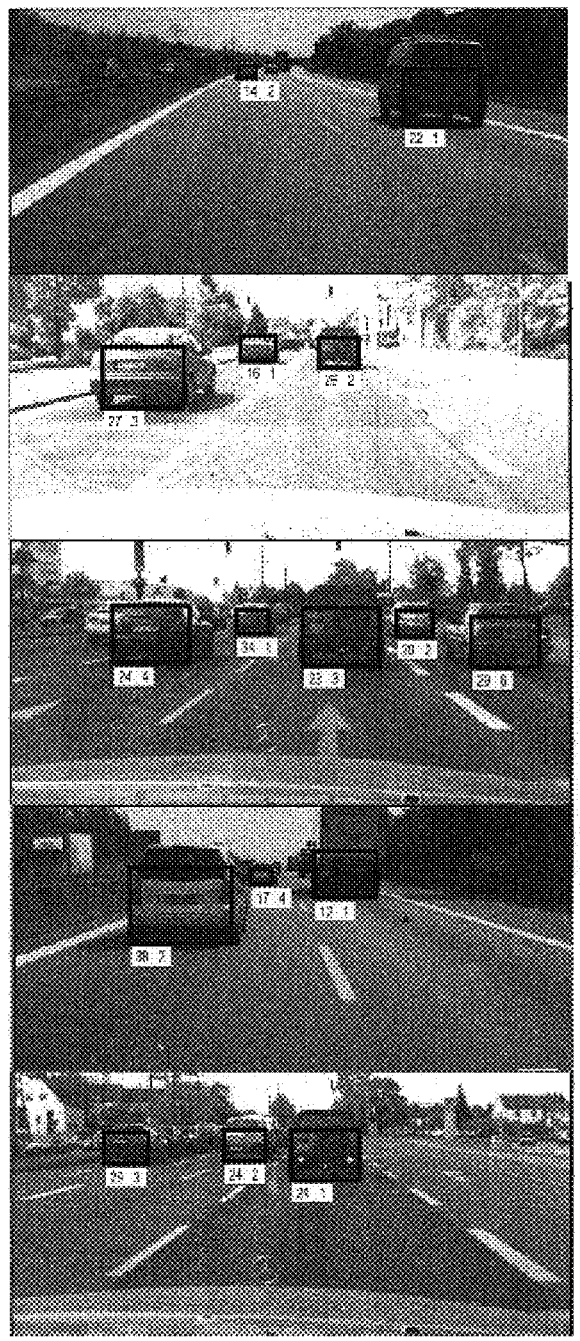
FIG. 7 illustrates examples of vehicle detection results in accordance with the present invention.

In accordance with the present invention, an example of how the method may be used will now be described. In the current example, the camera is calibrated. Examples of rear view images of cars and trucks are collected. Separate classifiers are trained to detect cars and trucks. Classifier performance is shown in FIG. 6. If 150 simple features are used, the composite error rate (i.e., miss detection rate plus false alarm rate) of the car classifier is approximately $10^{-4}$ on the training data set, and the composite error of the truck classifier is approximately $10^{-3}$ on the training data set. The number shows that truck appearance is more difficult to classify compared to cars due to different degrees of within-class variance. The number of frames used in fusion can be adjusted according to requirements on response time. During testing, a large degree of performance improvement was observed by fusing appearance, geometry and motion information. FIG. 7 shows examples of false detection eliminated by the fusion approach.

Having described embodiments for a system and method for detecting vehicles using a knowledge fusion framework, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method for on-road vehicle detection comprising the steps of:
   receiving a video sequence comprised of a plurality of image frames;
   identifying a potential vehicle appearance in an image frame;
   using known vehicle appearance information and scene geometry information to formulate initial hypotheses about vehicle appearance;
   tracking the potential vehicle appearance over multiple successive image frames;
   identifying potential motion trajectories for the potential vehicle appearance over the multiple image frames;
   applying knowledge fusion by assigning a confidence score to each trajectory of vehicle appearance, where the confidence score is defined as the product of probabilities obtained from appearance model, scene geometry model and motion model determined for each image frame containing the trajectories; and
   determining that a trajectory with a high confidence score represents a vehicle appearance.

2. The method of claim 1 wherein a potential vehicle appearance is determined by hypothesis testing using a probability model.

3. The method of claim 2 wherein the probability model is defined as the probability that a vehicle appears in an observed image patch.

4. The method of claim 2 wherein the probability model is obtained from known vehicle and non-vehicle training samples.

5. The method of claim 2 wherein the probability model is formed by using a set of image features as weak classifiers that characterize various vehicle aspects.

6. The method of claim 1 wherein the scene geometry models impose strong constraints on a location of a vehicle in a given image frame.

7. The method of claim 6 wherein the scene geometry model is a probability model defined as the joint probability distribution function of vehicle location and vehicle size inside an image frame.

8. The method of claim 7 wherein the joint probability distribution function of vehicle location and vehicle size in a given image frame is obtained as the product of probability distribution function of vehicle location in a give image frame and conditional probability distribution function of vehicle size given its location in a given image frame.

9. The method of claim 8 wherein the probability distribution function of vehicle location in a give image frame is a uniform distribution.

10. The method of claim 7 wherein the vehicle size in a given image frame is a function of vehicle location in a given image frame, vehicle size in the world coordinate system, and elevation of the road surface where the vehicle touches the road.

11. The method of claim 10 wherein given a vehicle location in a given image frame, the vehicle size in the world coordinate system is described as a random variable with a normal distribution, and elevation of the road surface is described as a random variable with a normal distribution.

12. The method of claim 8 wherein the conditional probability distribution function of vehicle size given its location in a given image frame is defined as a normal distribution.

13. The method of claim 12 wherein mean and covariance for the normal distribution are derived from mean and covariance of vehicle size in the world coordinate system and mean and covariance of elevation of the road surface where the vehicle touches the road.

14. The method of claim 1 wherein the motion models impose constraints on the movement of the potential vehicle appearance in a subsequent frame.

15. The method of claim 14 wherein the motion model is defined as conditional probability distribution function of vehicle location and vehicle size in an image frame given its location and size in the previous image frame and the two consecutive image frames.

16. The method of claim 15 wherein the conditional probability of the conditional probability distribution function of vehicle location and vehicle size is a normal distribution.

17. The method of claim 16 wherein mean of the normal distribution is an unbiased estimate of vehicle location and size given its location and size in a previous image frame and two consecutive image frames.

18. The method of claim 16 wherein covariance of the normal distribution is the covariance of an unbiased estimate of the vehicle location and size given its location and size in a previous image frame and two consecutive image frames.

19. The method of claim 1 wherein the video sequence is received from a camera mounted to a vehicle.

20. The method of claim 1 wherein trajectories of vehicle appearance are extended into each subsequent image frames using estimated image motion of the vehicle appearance.

21. The method of claim 1 wherein the step of applying knowledge fusion is applied to trajectories of vehicle appearance in each image frame of the video sequence.

22. The method of claim 1 wherein the appearance, scene geometry and motion information models are used to update the confidence score for each trajectory in each subsequent image frame in the video sequence.

23. The method of claim 1 wherein if the confidence score for a particular trajectory falls below a predetermined value, the particular trajectory is not tracked in subsequent image frames.

24. A system for on-road vehicle detection comprises:
   at least one camera for capturing a video sequence of image frames of background dynamics;
   a processor associated with the at least one camera, the processor performing the following steps:
   i). identifying a potential vehicle appearance in an image frame;
   ii). using known vehicle appearance information and scene geometry information to formulate initial hypotheses about vehicle appearance;
   iii). tracking the potential vehicle appearance over multiple successive image frames;
   iv). identifying potential motion trajectories for the potential vehicle appearance over the multiple image frames;
   v). applying knowledge fusion by assigning a confidence score to each trajectory of vehicle appearance, where the confidence score is defined as the product of probabilities obtained from appearance model, scene geometry model and motion model determined for each image frame containing the trajectories; and
   vi). determining that a trajectory with a high confidence score represents a vehicle appearance.

25. The system of claim 24 wherein a potential vehicle appearance is determined by hypothesis testing using a probability model.

26. The system of claim 25 wherein the probability model is defined as the probability that a vehicle appears in an observed image patch.

27. The system of claim 25 wherein the probability model is obtained from known vehicle and non-vehicle training samples.

28. The system of claim 25 wherein the probability model is formed by using a set of image features as weak classifiers that characterize various vehicle aspects.

29. The system of claim 24 wherein the scene geometry models impose strong constraints on a location of a vehicle in a given image frame.

30. The system of claim 29 wherein the scene geometry model is a probability model defined as the joint probability distribution function of vehicle location and vehicle size inside an image frame.

31. The system of claim 30 wherein the joint probability distribution function of vehicle location and vehicle size in a given image frame is obtained as the product of probability distribution function of vehicle location in a give image frame and conditional probability distribution function of vehicle size given its location in a given image frame.

32. The system of claim 31 wherein the probability distribution function of vehicle location in a give image frame is a uniform distribution.

33. The system of claim 31 wherein the vehicle size in a given image frame is a function of vehicle location in a given image frame, vehicle size in the world coordinate system, and elevation of the road surface where the vehicle touches the road.

34. The system of claim 33 wherein given vehicle location in a given image frame, the vehicle size in the world coordinate system is described as a random variable with a normal distribution, and elevation of the road surface is described as a random variable with a normal distribution.

35. The system of claim 31 wherein the conditional probability distribution function of vehicle size given its location in a given image frame is defined as a normal distribution.

36. The system of claim 35 wherein mean and covariance for the normal distribution are derived from mean and covariance of vehicle size in the world coordinate system and mean and covariance of elevation of the road surface where the vehicle touches the road.

37. The system of claim 24 wherein the motion models impose constraints on the movement of the potential vehicle appearance in a subsequent frame.

38. The system of claim 37 wherein the motion model is defined as conditional probability distribution function of vehicle location and vehicle size in an image frame given its location and size in the previous image frame and the two consecutive image frames.

39. The system of claim 38 wherein the conditional probability distribution function of vehicle location and vehicle size is a normal distribution.

40. The system of claim 39 wherein mean of the normal distribution is an unbiased estimate of vehicle location and size given its location and size in a previous image frame and two consecutive image frames.

41. The system of claim 39 wherein covariance of the normal distribution is the covariance of an unbiased estimate of the vehicle location and size given its location and size in a previous image frame and two consecutive image frames.

42. The system of claim 24 the at least one camera is mounted to a vehicle.

43. The system of claim 24 wherein trajectories of vehicle appearance are extended into each subsequent image frames using estimated image motion of the vehicle appearance.

44. The system of claim 24 wherein the step of applying knowledge fusion is applied to trajectories of vehicle appearance in each image frame of the video sequence.

45. The system of claim 24, wherein the appearance, scene geometry and motion information models are used to update the confidence score for each trajectory in each subsequent image frame in the video sequence.

46. The system of claim 24 wherein if the confidence score for a particular trajectory falls below a predetermined value, the particular trajectory is not tracked in subsequent image frames.

* * * * *